Figure 1:
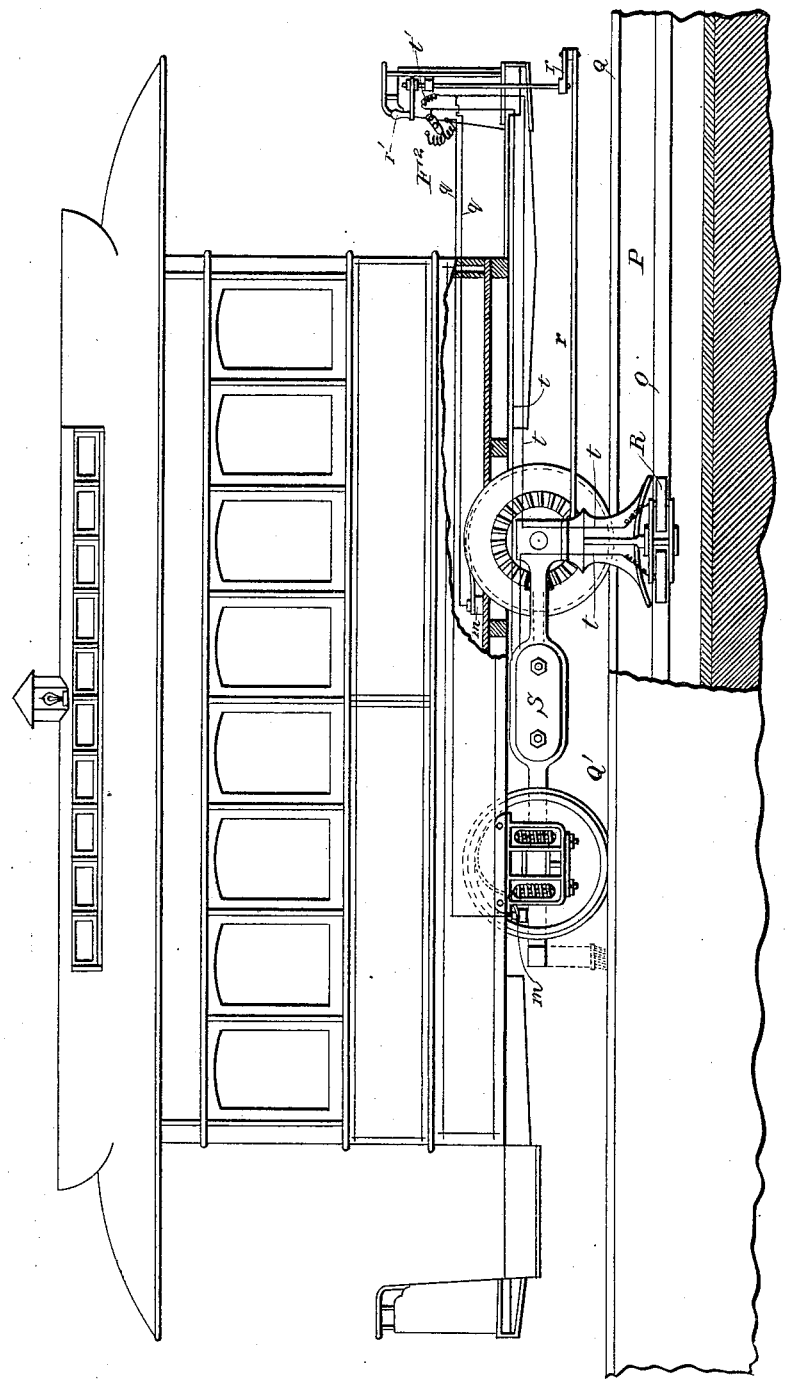

(No Model.) E. E. RIES. 2 Sheets—Sheet 1.
TRACTION INCREASING SYSTEM FOR ELECTRIC RAILWAYS.
No. 379,909. Patented Mar. 20, 1888.

ATTEST:
Percy C. Bowen.
Joseph Bricken.

INVENTOR:
Elias E. Ries.
By Harding & Tichenor
his Attorneys.

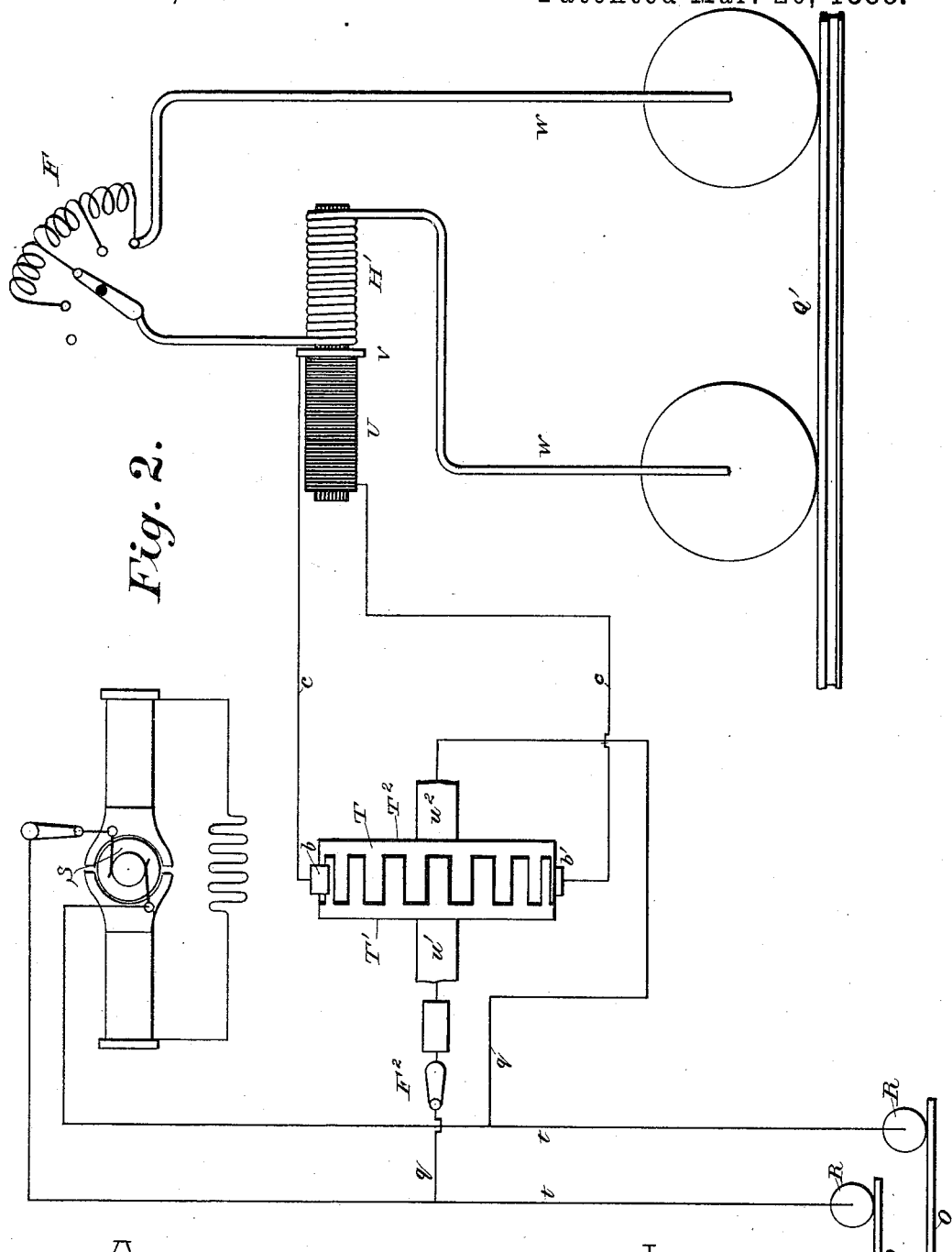

UNITED STATES PATENT OFFICE.

ELIAS E. RIES, OF BALTIMORE, MARYLAND.

TRACTION-INCREASING SYSTEM FOR ELECTRIC RAILWAYS.

SPECIFICATION forming part of Letters Patent No. 379,909, dated March 20, 1888.

Original application filed January 8, 1887, Serial No. 223,761. Divided and this application filed January 19, 1888. Serial No. 261,316. (No model.)

*To all whom it may concern:*

Be it known that I, ELIAS E. RIES, a citizen of the United States, residing at Baltimore city, in the State of Maryland, have invented certain new and useful Improvements in Traction-Increasing Systems for Electric Railways; and I do hereby declare the following to be a full, clear, and exact description of the invention, such as will enable others skilled in the art to which it appertains to make and use the same.

My invention is based upon the fact that a strong adhesive effect between metallic conductors in contact with each other is produced when an electric current is passed from one to the other. This adhesion I have found to increase in proportion to the quantity of current passing between the conductors, and this effect is particularly noticeable when the frictional contact is a rolling one as distinguished from sliding frictional contact, although it is also noticeable in the latter case.

In the operation of electric railways I have found that when the current is supplied to the motors on the cars through the rails upon which the wheels travel increased friction is caused by the passage of the current from the rails to the wheels, and that this increases the traction of the motor; but I have also found that this result, although beneficial in some cases, is detrimental to the operation of the system in other cases, for the increased traction will manifest itself at all times so long as the current passes—*i. e.*, so long as the motor is supplied with current and moves. The amount of traction in a system of the kind indicated is therefore not controlled by the operator or engineer, but fluctuates without regard to the momentary demands of the system, and in most cases in a manner contrary to these demands.
Precisely the same thing I have found to happen in such systems of electrical locomotion where the current is supplied to the motor through separate conductors and is returned through the wheels and traction-rails, for as long as current is passing to the motor in the manner indicated there will be increased traction, due to the increased friction between the wheels and rails at their points of contact produced by the current. The increased traction will therefore be present whether at a given moment it may be desirable or not.

Now, it is the object of my invention to utilize the phenomenon of increased friction produced by the passage of an electric current between the wheels of a motor-car and the rails upon which it travels for increasing the traction of the moving vehicle at the will of the operator or engineer, so as to have it entirely under control and adjustable according to the demands of the system from moment to moment. I accomplish this object in a variety of ways, all of which, however, have this in common, that I avail myself of the circuit of an electric railway, which circuit is composed, in part, of conductors extending parallel with the track, and that I establish a branch from said circuit around the motor of the electric locomotive. The current diverted into the branch circuit I utilize for increasing traction, either by including two or more wheels of the vehicle and the rails extending between the same directly into said branch or by charging a self-contained circuit, including such wheels and rails, inductively by the current in the branch circuit. In both cases the motor-circuit may be closed or opened, the motor-car or electric locomotive may be propelled fast or slow, or may be stopped entirely, without affecting the integrity of the circuit, which serves the purpose of increasing the traction of the vehicle, which circuit I shall hereinafter call the "traction-circuit." I am thus enabled, by means of suitable resistance in the traction-circuit, to control the traction of an electric locomotive or of a vehicle attached to the same at will.

In practicing my novel method of increasing the traction of vehicles in general it is preferable to employ a current of large volume and comparatively low tension. In fact, the current must be such as to produce considerable heating effect at the points of contact of the wheels with the rails, and unless such heating effect is produced to an appreciable extent there is no increase of traction. I desire to emphasize this point, so that it may be understood that the currents ordinarily employed for signaling and other purposes will be entirely insufficient to produce a perceptible trace of increased traction. The current therefore which must be employed to have the beneficial effect aimed at I shall hereinafter call a "traction-current," which will be understood to be such as produces a perceptible heating effect at the juncture of two metallic conductors through which it passes.

The apparatus which I employ for practicing my novel method may assume a great number of forms, some of which I have illustrated in the accompanying drawings, in which—

Figure 1 represents an elevation, partly in section, of an electric locomotive equipped with my invention; and Fig. 2 is a diagrammatic view of an electric-railway system in which the traction-circuit is charged inductively by the main propelling-current.

If a current of comparatively low tension and great volume is employed for the propulsion of electric locomotives, I arrange the traction-circuit in the manner illustrated in Fig. 1.

Line-conductors O O, one of which only is shown in the drawings, are provided in a trench or channel, P, extending between the rails Q Q, and a contact-truck composed of rollers R R takes the current from the line-conductors to the electric motor S, which is geared to the driving-wheels, as indicated in the drawings. A system of levers and rods, $r$ $r$, actuated by a crank, $r'$, under the control of the driver or engineer, is connected with the contact-truck, whereby the latter may be brought to bear upon the line-conductors, or to break contact with the same, as is usual in such systems.

The motor-circuit is indicated at $t$ $t$, &c., extending from one contact-roller to the motor and from the latter to the platform of the car or vehicle, where it includes a resistance, $t'$, and from whence it returns to the other contact-roller. The drawings clearly illustrate this circuit, which can be traced without difficulty. The means for varying the power of the motor are not shown in the drawings. They may be of any ordinary or improved construction, and form no necessary part of my present invention. The traction circuit constitutes a shunt around the resistance $t'$. It is composed of the conductors $q$ $q$, &c., the adjustable rheostat $F^2$, the contact-brushes $m$ $m$, bearing upon the driving-wheels, and the portions $Q'$ of the rails which extend between these wheels.

The switch-lever shown as part of the rheostat $F^2$ enables the driver or engineer to open or close the traction-circuit and to introduce more or less resistance in the same, according to the requirements, at a given moment. If increased traction is required, the traction-circuit is closed and is charged more or less, according to the lesser or greater amount of resistance introduced. This operation of the traction-circuit does not perceptibly affect the operation of the motor, for the two are in multiple-arc branches from the line, which latter is charged by dynamos regulated according to the demands of the system, the same as in systems of incandescent electric lighting. The traction produced is therefore under the control of the operator and is independent of the power supplied to the motor. It will be understood that the traction-circuit may be arranged to include the wheels either in multiple arc or in series, as described in another pending application, Serial No. 223,761, filed January 8, 1887, of which this is a division. If the motor-current is one of high tension and small quantity, which could not be effectively used for the purpose of increasing frictional contact between the wheels of the vehicle and the rails, I transform the currents intended for the traction circuit into such of the required tension and volume and employ the arrangement shown in Fig. 2.

The line-conductors O O may be arranged overhead or underground, and the contact-rollers R R are understood to be under the control of the engineer. The high-tension current is supplied to the motor S by conductors $t$ $t$, and a branch, $q$ $q$, including an adjustable rheostat and switch lever, $F^2$, is in this instance not directly connected with the traction-circuit proper, but includes a commutator, T, designed to render the continuous current derived from the motor circuit alternating and intermittent. This commutator is composed of two flat cylinders, $T'$ $T^2$, each having a crown of segmental teeth cut into one face, with segmental spaces alternating with the same. The two cylinders are each mounted upon a separate shaft, $u'$ $u^2$, respectively, and are united together, with their segmental teeth and spaces in mutual engagement, but insulated from each other, as indicated in heavy lines. The two shafts are in alignment, so that they have the effect of a single shaft, common to both cylinders constituting the commutator, and the latter is rotated with its shaft by any suitable means. Brushes $b$ $b'$, bearing on diametrically-opposite sides of the commutator, upon the segmental portions of the same, establish each electrical connection alternately with one and the other of the cylinders $T'$ $T^2$, and these brushes are connected by wires $c$ $c$ with the terminals of the fine-wire coil U of the inductorium V, the coarse-wire coil $H'$ of which is connected with the traction-circuit proper, composed of conductors W W, rheostat F, the wheels of the vehicle, and the rails $Q'$ between the latter.

The operation of this apparatus will now be easily understood. If it is desired to increase the traction, the switch at rheostat $F^2$ is manipulated, and the circuit through commutator T and coil U of the inductorium is closed with the desired resistance. It will be apparent without further description that the straight current of high tension derived from the motor-circuit will traverse the high-resistance or primary coils of the inductorium as a series of alternating impulses following each other with great rapidity, and that similar alternating impulses of low tension will be generated in the low-resistance or secondary coils of the inductorium and will traverse the traction-circuit. The immediate source of current for the traction-circuit is therefore the coarse-wire coil H', and the traction-circuit will be arranged upon the vehicle to include the wheels and the rails extending between the same either in multiple arc or in series.

Both rheostats and switches F and F² should be arranged within convenient reach of the operator or engineer, and in this form of my apparatus the traction-circuit is self-contained upon the vehicle or train of vehicles, including the rails between the wheels and traveling with the same. At the same time the traction is completely under the control of the operator and is in a great measure independent of the power supplied to the latter.

It is apparent that the principles of my invention may be embodied in apparatus widely differing from the specific constructions herein shown and described, and that the methods of operation may also be variously changed without departing from the fundamental idea which underlies my invention. I am, for this reason, not limited to the identical features of detail set forth in this specification.

It is obvious that the traction-circuits need not necessarily be arranged to include the wheels on both sides of the car or vehicle, since it is quite practicable to pass the traction-current between two wheels only on one side of the track. The drawings illustrate this mode of operation, and this will be the mode of operation if the car or vehicle should be on a section of the track where the adjoining rails on one side are accidentally insulated from each other at the fish-plates, as frequently happens.

Having now fully described my invention, I claim and desire to secure by Letters Patent—

1. The method of increasing the traction of electrically-propelled vehicles, which consists in establishing a traction-circuit including two or more wheels of the vehicle and the rails extending between the same, and charging said circuit with currents of low tension derived from the circuit supplying the motor, substantially as described.

2. The method of increasing the traction of a wheeled vehicle moving upon a metallic track, which consists in transforming currents of high tension passing upon the vehicle into currents of low tension, and then passing such low-tension currents through a traction-circuit including two or more wheels and the rails extending between the same, substantially as described.

3. The method of increasing the traction of a wheeled vehicle moving upon a metallic track, which consists in establishing and maintaining a traction-circuit moving with the vehicle and including two or more wheels and the portion of the rails extending between the same, and charging said circuit with alternating electrical currents of low tension, substantially as described.

4. The combination of a wheeled vehicle moving upon metallic rails and an electric motor mounted upon the vehicle for propelling the same, with a traction-circuit derived from the circuit supplying the motor, including two or more wheels of the vehicle and the rails extending between the same, substantially as described.

5. The combination of a wheeled vehicle moving upon metallic rails and an electric motor mounted upon the vehicle for propelling the same with a traction-circuit derived from the circuit supplying the motor, including two or more wheels of the vehicle and the rails extending between the same, and an adjustable resistance and switch in the traction-circuit, substantially as described.

6. The combination of a wheeled vehicle moving upon a metallic track and an electric motor actuated by currents of low tension and high quantity, mounted upon the vehicle for propelling the same, with a circuit derived from the motor-circuit charging inductively with currents of low tension and great quantity a traction-circuit including two or more wheels of the vehicle and the rails extending between said wheels, substantially as described.

7. The combination, with a track composed of conducting-rails, of a wheeled vehicle mounted thereon, an electric circuit traversed by a current of high tension for propelling said vehicle, a transformer or secondary generator having one of its coils included in said circuit, and a traction-circuit including the other coil of said transformer, two or more wheels of the vehicle, and the rails extending between the same, substantially as described.

8. In an apparatus for increasing the traction of railway-vehicles, the combination of a motor-circuit traversed by the current of high tension with a circuit derived from the motor-circuit, provided with means for rendering said current alternating and intermittent, including the high-resistance coil of a transformer, and a traction-circuit including the low-resistance coil of the transformer, two or more wheels of the vehicle, and the rails extending between the same, substantially as described.

In testimony whereof I affix my signature in presence of two witnesses.

ELIAS E. RIES.

Witnesses:
F. R. HARDING,
PERCY C. BOWEN.